May 12, 1964 A. W. EVANSEN 3,132,856

CARD PROCESSING APPARATUS

Filed March 14, 1960 3 Sheets-Sheet 1

INVENTOR:
Arthur W. Evansen
By Smyth & Roston
Attorneys.

May 12, 1964 A. W. EVANSEN 3,132,856

CARD PROCESSING APPARATUS

Filed March 14, 1960 3 Sheets-Sheet 2

INVENTOR:
Arthur W. Evansen

By Smyth & Roston

Attorneys.

May 12, 1964 A. W. EVANSEN 3,132,856

CARD PROCESSING APPARATUS

Filed March 14, 1960

3 Sheets-Sheet 3

INVENTOR:
Arthur W. Evansen

By Smyth & Roston
Attorneys.

United States Patent Office 3,132,856
Patented May 12, 1964

3,132,856

CARD PROCESSING APPARATUS

Arthur W. Evansen, Los Angeles, Calif., assignor to The Magnavox Company, Los Angeles, Calif., a corporation of Delaware Filed Mar. 14, 1960, Ser. No. 14,614
8 Claims. (Cl. 271—5)

The present invention relates to information storage card processing apparatus. The invention is more particularly directed to an improved control system for use in conjunction with one or more feeding stations included in the apparatus so as to indicate when a last card has been fed from such a feeding station.

The term "information storage card" is intended to be used generically in the subsequent description and claims. The term is intended to cover, not only actual cards, but any discrete element on which information may be stored for subsequent reproduction. Such elements may include, for example, plates, panels and boards. The information may be stored on the information storage cards in the form of separate magnetic areas which are magnetized in one manner to represent a binary "1," and which are magnetized in an opposite manner to represent binary "0."

In one known type of card processing apparatus, the information storage cards are maintained in stacked relationship in each of a plurality of feeding stations. The cards in the feeding stations are controllably introduced in succession to a transport medium. The cards are then carried by the transport medium past a transducer station at which the information on the cards is read and transformed into electrical signals. These electrical signals may be used to control the card processing apparatus so as to cause the apparatus to perform certain collating or sorting operations on the cards, or to cause an index search to be conducted for a desired card or group of cards. Conversely, new information may be recorded on the cards at the transducer station from input electrical signals.

More recent types of card processing apparatus have been constructed to incorporate reversible stations. Each of these stations is capable of functioning as a feeding station for the cards in one mode of operation, and as a receiving or stacking station for the cards in another mode of operation. The use of reversible stations of this type increases the flexibility of the apparatus to a large extent. Reversible feeding-stacking stations are described and claimed, for example, in Patent 2,842,362 issued July 8, 1958, in the name of Robert M. Hayes et al.; and in copending application Serial No. 645,639 which was filed March 12, 1957, now Patent No. 2,969,979, in the name of Alfred M. Nelson et al.

For convenience in loading and unloading the feeding-stacking stations, the cards are preferably stored in magazines. Then, when it is desired to process a group of cards, the magazine containing that group is inserted into a corresponding one of the stations. The station is controlled so that the cards in the magazine may be sequentially fed to the transport medium for processing by the apparatus. At the termination of such processing, the cards may be sequentially returned to the same, or to a different, magazine. The magazines may then be removed from the station and returned to an appropriate file block.

Feeding-stacking stations utilizing magazines of the type described in the preceding paragraph are disclosed and claimed, for example, in copending application Serial No. 685,539, filed September 23, 1957, now Patent No. 2,901,247, in the name of Allan Arner. This copending application discloses card processing apparatus in which the different groups of cards are held in separate magazines, with each magazine holding its group of cards in a stacked relationship. The improved card processing apparatus of the Patent No. 2,901,247 is constructed so that a selected magazine of cards may be quickly moved into place in a feeding-stacking station. The magazine is then held in a position so as to permit the cards immediately to be fed in succession to the transport medium of the card processing apparatus. A magazine type of card processing apparatus is also disclosed and claimed in copending application Serial No. 767,132 which was filed October 14, 1958, now Patent No. 3,041,066, in the name of Alfred M. Nelson et al.

Various collating and sorting operations of the information storage cards require that the cards be controllably transferred to transport means from different ones of a plurality of first stations and that the cards be transported in a controlled manner and received by selected ones of a plurality of second stations. Such transfer of cards from the first stations to the second stations continues until the first stations are empty. When the first stations become empty, the pass is completed and the stations are automatically set to the opposite modes of operation. Specifically, when the indication is received that the first stations are empty, the first stations are set to receive cards and the second stations are now set to obtain a transfer of the cards from the second stations to the transport means for movement to the first stations.

The second pass is then initiated. When the second pass is completed, as indicated by the second stations becoming empty, the controls are again effectuated to reverse the modes of operation of the first and second stations. These passes continue until the particular operation to be performed on the cards has been completed. It will be observed that at the end of each pass, the first and second stations are actuated from one of their modes of operation to the other such that the first stations are in one mode of operation and the second stations are in a second mode of operation. It will also be observed that this actuation is initiated when the stations providing a transfer of cards to the transport means become empty.

The actuations described above have been controlled in several prior art systems and apparatus by mechanically actuated electric switching means. For example, in the apparatus described in Patent No. 2,969,979, each station is provided with a feed head which engages the leading card in the station and which controls the sequential transfer of the cards to the transport means. Each of the feed heads in the Orner apparatus is provided with electric contacts which normally are open circuited. A contact strip is carried by a card follower which is variably positioned in the station in accordance with the number of cards in the station. When the last card is transferred from the station to the transport means, this contact strip engages the contacts on the feed head to close an electrical circuit. This circuit causes the appropriate controls to be initiated so that the stations may be changed from one operating mode to another, for the reasons described above. For example, the stations become changed from a feeding mode for obtaining a transfer of cards from the station to a stacking mode for obtaining a transfer of cards into the station.

The prior art switching means described in the preceding paragraph have been found to be generally satisfactory in carrying out their intended purposes. Certain difficulties have been encountered, however, due to interference created by corroded or oxided contacts. Moreover, any movement of the feed head tends to wipe the contact strip on the feed head and produce spurious signals.

The present invention has been conceived to overcome the difficulties set forth in the previous paragraph. The assembly of the invention is included in a station to produce a signal indicating that the station is empty. The assembly is advantageous in that it is not susceptible to the production of faulty or spurious signals even when the feed head becomes moved. Moreover, the control system of the present invention is relatively easy to construct and install.

In the assembly constituting the present invention, photo-electric means are used to indicate when the last card leaves a particular station. In practicing one embodiment of the invention in the magazine type of station, for example, a light source is mounted above the station and an aperture is disposed in the forward end of the magazine to obtain a passage of the light from the source through the aperture. A spring-biased card follower may be included in the magazine to hold the cards in a stacked condition, and this card follower is spring biased forwardly in the magazine as the cards are fed out of the magazine. A light conductor, such as a plastic rod, is mounted on the card follower.

As the magazine approaches its empty state, the light conductor moves toward the aperture in the magazine. When the last card leaves the magazine, this light is directed by the light conductor to the surface of the feed head. The light is received at the surface of the feed head by another light conductor which is embedded in the feed head. This light conductor introduces the light to a photo-sensitive diode which in turn causes a relay to be energized so as to provide an indication that the station is empty.

Although the control assembly of the invention will be described as applied to a magazine type of feeding station, it will become evident as the description proceeds that the control can be applied to a wide variety of types of feeding stations to indicate when a last card has left any one of these stations.

Figure 1:
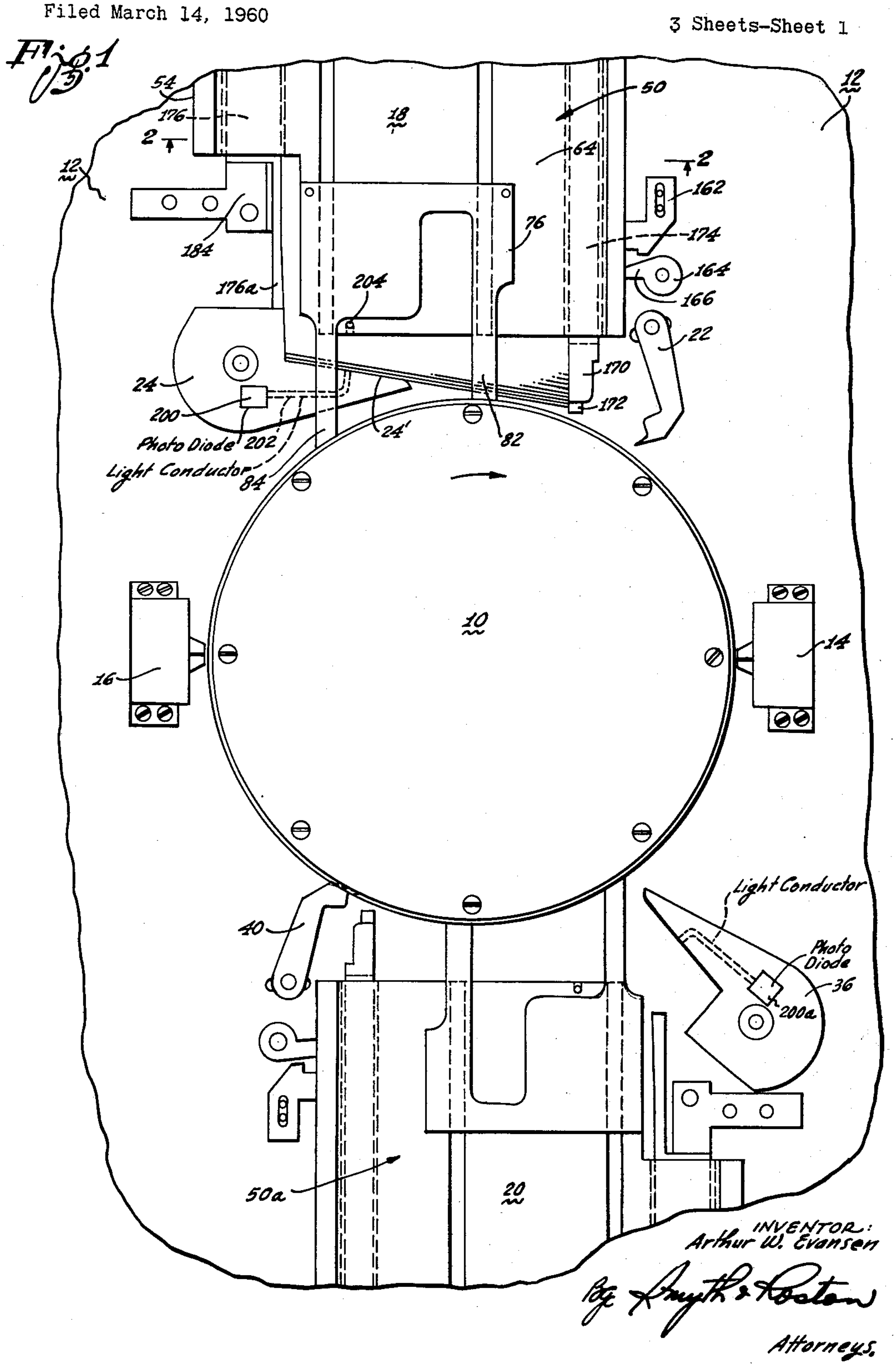
FIGURE 1 is a top plan view of a simplified form of card processing apparatus which is constructed to incorporate the control system of the present invention, the illustrated apparatus including a pair of reversible feeding-stacking stations which are positioned adjacent a transport medium such as a vacuum pressure rotatable transport drum.
Figure 5:
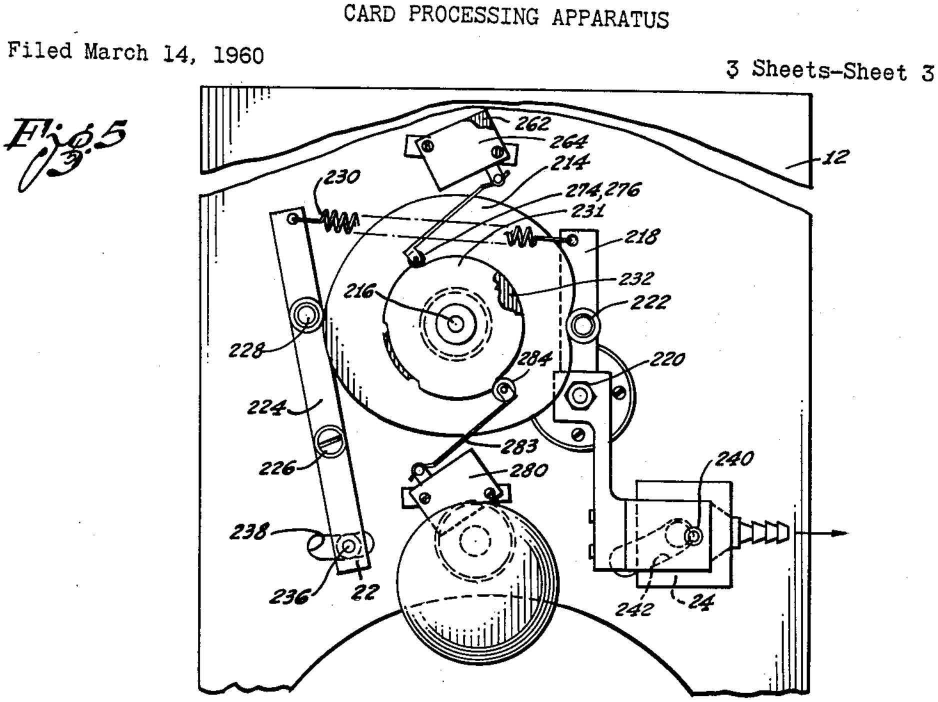
Figure 6:
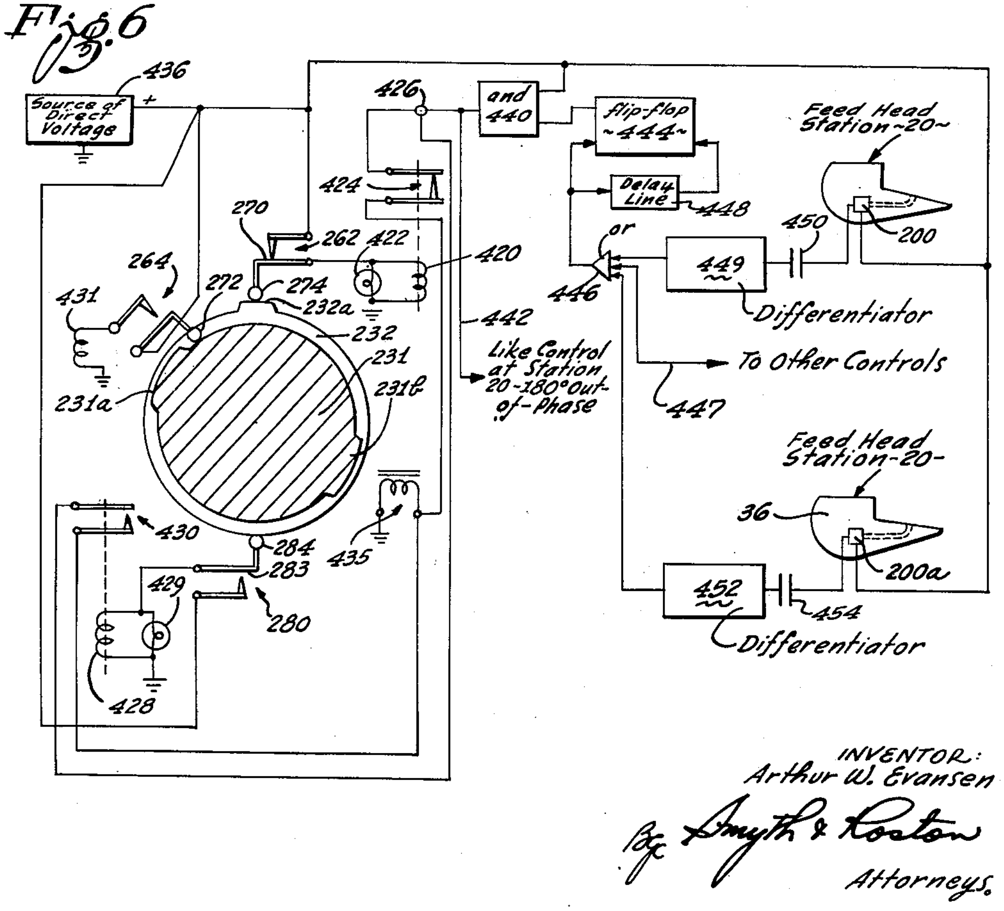

FIGURE 5 is a bottom view of one of the feeding-stacking stations in FIGURE 1 and illustrates the various mechanical controls which cause the station to be conditioned to its feeding mode or to its stacking mode, this view also showing various electrical control switches which are associated with the mechanical elements and which are actuated by those elements; and FIGURE 6 is a schematic and diagrammatic representation of a suitable electronic control system which responds to control signals developed by the apparatus constituting the invention to condition a feeding-stacking station from one of its operating modes to the other.

The card processing apparatus and system of FIGURE 1 is shown as including a transport medium such as a vacuum pressure transport drum 10. This drum is constructed, for example, in the manner described and claimed in Patent 2,883,189 issued April 21, 1959 in the name of Loren R. Wilson. The vacuum pressure transport drum 10 is rotatably mounted on a table top 12 for rotation in a clockwise direction. The drum is capable of exerting a vacuum pressure at its peripheral surface, and it is by means of this vacuum pressure that the information storage cards are held at spaced angular positions on the peripheral surface of the drum for transportation from one station to another.

Although a rotatable vacuum pressure transport drum, such as the drum 10, is illustrated in FIGURE 1 for transporting the cards, any other suitable transport means may be used and such transport means do not necessarily have to be movable. For example, stationary transport means may be used such as disclosed in copending application Serial No. 730,102 filed April 22, 1958 in the name of Eric Azari et al.; and in copending application Serial No. 731,413 filed April 28, 1958, now Patent No. 2,981,411, in the name of Eric Azari.

A first transducing means 14 is mounted on the table top 12, and that transducing means is positioned to be contiguous to the periphery of the vacuum pressure transport drum 10. A second transducing means 16 may also be mounted on the table top 12. This second transducing means is positioned on the opposite side of the drum 10 from the transducing means 14, and the transducing means 16 is also positioned to be contiguous to the periphery of the drum. Each of the transducing means 14 and 16 may, for example, comprise a plurality of electromagnetic write or read transducer heads or may comprise any other type of member for sensing information from the cards or for recording information on the cards when the member is disposed in coupled relationship to the information on the cards. Each of the magnetic heads is positioned to sense and process a different row of magnetic recordings on each of the cards transported on the periphery of the transport drum 10 past its corresponding transducing means.

A first reversible feeding-stacking station indicated generally as 18 is positioned on the table top 12. A second reversible feeding-stacking station 20 is also positioned on the table top 12 in diametrically opposed relationship to the table top 12. Both the feeding-stacking stations 18 and 20 are shown in fragmentary form to conserve space. The forward end of each of these stations only is shown, as such a showing is believed to be sufficient for purposes of explaining the operation of the present invention.

The station 18 includes a stack head 22, and it also includes a feed head 24 which has a face 24'. These heads may be constructed and controlled in a manner fully described in the Patent No. 2,969,979 referred to above. Briefly, the stack head 22 is movable from its illustrated stand-by position in FIGURE 1, to an operative position in which its end is contiguous to the periphery of the transport drum 10. The operative position of the stack head 22 in the station 18 corresponds to the disposition of a stack head 40 in a station 20 in FIGURE 1. In its operative position, the stack head 22 engages cards transported on the peripheral surface of the drum 10 to cause such cards to be transferred from the peripheral surface of the drum and to be deposited in the station 18.

The feed head 24 is movable from a stand-by position to its illustrated operative position in FIGURE 1. When the feed head is in its operative position, it controls the transfer of cards to the peripheral surface of the drum 10. This control is made through a vacuum pressure which the face 24' of the feed head exerts on the leading card in the station. The vacuum pressure exerted on the leading card by the feed head 24 may be controllably interrupted to cause that card to become transferred to the periphery of the transport drum 10. Such a feed head and the vacuum pressure control exerted on the cards by the feed head are described in detail in Patent No. 2,969,979.

Patent No. 2,969,979 also fully describes the manner in which the feed head 24 and the stack head 22 may be moved between their stand-by and operative positions. Because the actual control and operation of the feed head and of the stack head form no part of the present invention, it is believed unnecessary to describe in detail the manner in which these heads are controlled. It is believed sufficient to state that the heads may be conveniently controlled by mounting them on appropriate levers and by providing a cam control for the levers, as will be described briefly in conjunction with FIGURE 5. Such a control is described in detail, for example, in Patent No. 2,969,979. The control causes one of the heads to be moved to its operative position as the other is moved to a stand-by position, and vice versa.

The feeding-stacking station 20 may include a feed head 36 which is movable between an operative and a stand-by position, and it may include a stack head 40 which likewise is movable between a stand-by and an operative position. The stack head 40 and the feed head 36 may be similar to the corresponding heads 22 and 24 described above in conjunction with the feeding-stacking station 18. The heads 36 and 40 may be controlled to be moved between their individual operative and stand-by positions in the same manner as described in the Patent No. 2,969,979. The stack head 40 is shown in its operative position in FIGURE 1 and the feed head 36 is shown in its stand-by position in that figure.

Figure 2:
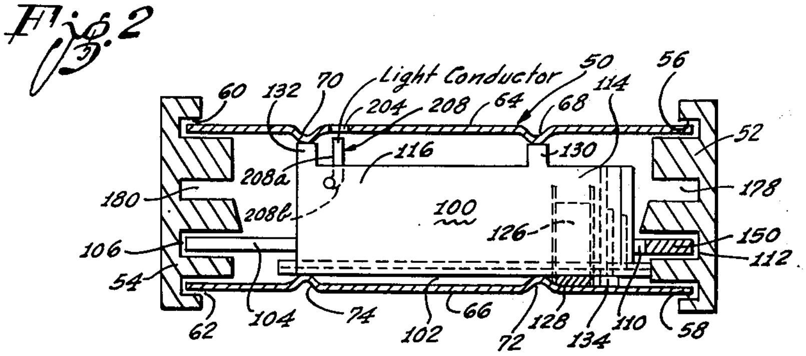
FIGURE 2 is a sectional view substantially on the line 2—2 of FIGURE 1, the sectional view showing details of a removable magazine positioned in one of the feeding-stacking stations of FIGURE 1 and also showing a spring-biased card follower which is positioned in the magazine for movement towards and away from the mouth of the magazine and which carries a light conductor.

A removable magazine 50 may be supported in the station 18. This magazine has a rectangular configuration as defined by a pair of side walls 52 and 54. As best shown in FIGURE 2, for example, the inner surface of the side wall 52 is provided with an upper slot 56 and a lower slot 58. These slots extend lengthwise along the entire inner surface of the side wall 52. In like manner, the inner surface of the side wall 54 is provided with a slot 60 which is aligned with the slot 56 in the side wall 52, and which extends along the entire inner surface of the side wall 54. A lower slot 62 is also formed in the inner surface of the side wall 54, and the latter slot is aligned with the slot 58 in the side wall 52 and extends along the entire inner surface of the wall 54.

A top panel 64 is inserted in the slots 56 and 60 and is attached to the side walls 52 and 54 by welding, or by any other appropriate means. Likewise, a lower panel 66 extends into the slots 58 and 62, and the lower panel is attached to the side walls by welding, or by any other appropriate technique. The panels 64 and 66 form the top and bottom of the magazine respectively. These panels, together with the side walls 52 and 54, cooperate to form an open mouth at the forward end of the magazine.

A pair of ribs 68 and 70 are formed on the inner surface of the upper panel 64, and these ribs extend in parallel relationship lengthwise along the panel. A similar pair of ribs 72 and 74 are formed on the inner surface of the lower panel 66, and these latter ribs extend in parallel relationship along the entire length of the lower panel. The ribs 68 and 70 are spaced and parallel to one another in the plane of the upper panel 64, and the ribs 72 and 74 are spaced and parallel to one another in the plane of the lower panel 66. The ribs 68 and 72 are axially aligned with one another as are the ribs 70 and 74. These ribs engage the edges of the cards which are to be held in the magazine, and they form guides for the cards as the cards are moved back and forth in the magazine.

An upper bracket 76 (FIGURE 1) is affixed to the top panel 64 of the magazine by welding, or by any other appropriate means. The bracket 76 has a pair of finger-like elements 82 and 84 which extend outwardly from the mouth of the magazine and over the outer peripheral surface of the drum 10. These finger-like elements have bent-over end portions which extend downwardly over the top edge of any card transported by the drum to the mouth of the magazine 50.

A bracket similar to the upper bracket 76 is mounted on the lower panel 66, and the lower bracket also has a pair of finger-like elements which extend outwardly from the mouth of the magazine and under the rim of the vacuum transport drum 10. The finger-like elements of the lower bracket have bent-over ends which extend upwardly over the lower edge of any card transported by the drum to the mouth of the magazine.

The finger-like elements 82 and 84 of the upper bracket 76, and of the lower bracket, described in the preceding paragraphs permit the mouth of the magazine to be spaced back from the peripheral surface of the vacuum pressure transport drum 10, so that the feed head 24 and the stack head 22 may be moved between their operative and stand-by positions without interference by the walls of the magazine. The finger-like elements extend outwardly over the cards which are disposed in the space between the mouth of the magazine and the periphery of the drum 10, as such cards are successively fed from the magazine in sequence to the periphery of the drum during a feeding mode of operation; or when such cards are fed from the periphery of the drum into the magazine during a stacking mode of operation.

Then, when it is desired to withdraw the magazine from the station, the bent-over portions of the finger-like elements engage the card actually on the periphery of the drum 10 and draw that card, and the cards in the space between the mouth of the magazine and the periphery, away from the drum. The bent-over finger-like elements, and certain sliding elements which are described and claimed in copending application Serial No. 823,690 filed June 29, 1959, now Patent No. 2,977,113, in the name of Herman S. Malin et al. and which will be described, cage the cards at the forward end of the magazine as the magazine is withdrawn from the station. These elements firmly retain the cards in the magazine so as to prevent the cards from falling out of the magazine.

A card follower 100 (FIGURES 2 and 3) is positioned in the magazine for longitudinal movement along the ribs 72 and 74 towards the mouth of the magazine and away from the mouth. The card follower 100 may be constructed in the manner described in copending application Serial No. 717,270 which was filed February 24, 1958, now Patent No. 2,947,538, in the name of Eric Azari et al.

The card follower 100 is spring biased toward the mouth of the magazine and its function is to maintain the cards in a stacked condiiton in the magazine and to urge the cards against the peripheral surface of the transport drum 10. Then, as the cards are sequentially fed to the periphery of the transport drum, the card follower 100 is moved forward in the magazine by its spring biasing pressure. Conversely, when the cards are stacked from the drum in the magazine during a stacking mode of operation, the card follower 100 moves back against its spring biasing pressure. During both modes of operation, however, the card follower 100 is forced against the rear of the stack of cards in the magazine to hold the cards in a stacked condition.

The card follower 100 includes a flat bottom panel 102 which may have a lubricating substance, such as that designated by the trade name of Teflon, attached to its lower surface and which engages the ribs 72 and 74. A first guide strip 104 is secured to one side of the bottom panel 102, and this guide strip extends into a slot 106 which is formed on the inner surface of the side wall 54. The slot 106 extends for the length of the side wall 54, and it serves as a guide for the card follower 100.

The bottom panel 102 of the card follower also has a pair of elongated members 108 and 110 secured to its opposite edge. These latter members serve as guide strips and are disposed adjacent a slot 112 (FIGURE 2) which is formed in the inner surface of the side wall 52. The latter slot extends lengthwise along the entire length of the inner surface of the side wall 52.

Figure 3:
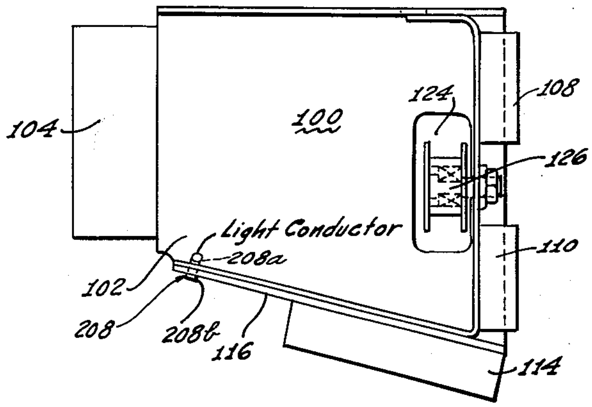
FIGURE 3 is a top view of the card follower positioned in the magazine, this latter view showing various components of the card follower and also showing the manner in which the light conductor is mounted on the card follower.

A resilient pad 114 formed, for example, of sponge rubber or similar substance, is secured to an upstanding bracket 116 at the front of the card follower 100. As illustrated in FIGURE 3, the bracket 116 and the member 114 are inclined when viewed in plan so that the cards may be brought into the proper position for feeding them to the periphery of the drum 10, when the station is conditioned to a feeding mode.

The bottom panel 102 of the card follower 100 has a slot 124 formed in it adjacent the elongated members 108 and 110. A bearing 126 is rotatably mounted on an appropriate bracket to be disposed over the slot 124. A resilient spring strip 128 is secured to the panel 66 at its forward end, and this spring strip has a tendency to curl up on itself around the rotatable bearing 126. This action of the spring strip 128, and of the bearing 126, causes the card follower to be biased forwardly towards the mouth of the magazine, for the reasons described above.

The upstanding bracket 116 is equipped with a pair of upwardly extending portions 130 and 132 (FIGURE 2). These portions 130 and 132 engage the ribs 68 and 70 respectively. A guide rail 134 is inserted in the lower panel 66, and this guide rail extends into a slot formed in the bottom of the panel 102. Therefore, the spring biased card follower 100 is supported between the ribs 68, 72, 70 and 74 and by the guide bracket 104 and the guide rail 134. The card follower 100 is supported in this manner for longitudinal movement in the magazine towards and away from the mouth of the magazine. As mentioned above, the spring strip 128 serves to bias the follower towards the mouth of the magazine.

An elongated locking bar 150 is mounted in the panel 112 of the side wall 52 to lie adjacent the edges of the elongated members 108 and 110. The outer edges of the members 108 and 110 may be serrated, as may the facing edge of the locking bar 150. As described in detail in the copending application Serial No. 823,690, the locking bar 150 is mounted in the slot 112 for limited longitudinal movement relative to the side wall 52. The arrangement is such that, when the locking bar 150 is moved forwardly in the slot 112 towards the mouth of the magazine, the locking bar moves laterally away from the members 108 and 110 to a disengaged position. However, when the locking bar 150 is moved rearwardly along the slot 112 away from the mouth of the magazine, it is moved laterally inwardly so that its inward edge engages the facing edges of the members 108 and 110. This latter movement of the locking bar is into an engaged position with respect to the card follower 100. When the locking bar is in such an engaged position, it firmly retains the card follower 100 in whatever position the card follower was established by the stack of cards in the magazine when the locking bar moves to its engaged position.

As shown in FIGURE 1, for example, a pawl 162 is mounted in the station 18. The pawl has a portion extends through the slot in the side wall 52 of the magazine 50 to be engaged by a projection in the magazine as the magazine is moved into place in the station 18. The pawl 162 is mounted for limited reciprocal movement in the station 18, and it is spring biased by any appropriate biasing means (not shown) in a rectilinear direction towards the rear of the magazine.

A further actuating pawl 164 is rotatably mounted in the station 18, and this latter pawl is spring biased by any appropriate biasing means (not shown) in a clockwise direction. The pawl 162 engages the further pawl 164 so that when the pawl 162 is moved by the projection in the magazine, it moves against the further pawl 164 and rotates the further pawl in a counter-clockwise direction against its spring biased pressure.

The further pawl 164 has an actuating arm which extends through the slot in the side wall 52 of the magazine and into engagement with a shoulder formed in the locking bar 150. The result is that when the magazine 50 is moved into place in the station 18, the projection in the magazine moves against the pawl 162 and causes that pawl to move against the pawl 164. The pawl 164 is thereby rotated in a direction such that its actuating arm causes the locking bar 150 to be moved towards the mouth of the magazine. This action serves to disengage the locking bar from the card follower 100. Conversely, when the magazine is moved back out of the station 18, the locking bar 150 becomes disengaged from the arm 166 of the pawl 164, and it is spring biased back into locked engagement with the card follower 100.

The operation described above provides that whenever the magazine 50 is placed in an operating position in the station 18, its card follower 100 is freed, and the card follower is spring biased towards the mouth of the magazine. This permits the card follower to perform its intended function of maintaining the cards in the magazine in a stacked condition against the peripheral surface of the transport drum 10. However, whenever the magazine is removed from the station, the card follower 100 immediately becomes locked by the locking bar 150 against the stack of cards in the magazine to retain the cards in the magazine. In this manner, the cards are prevented from falling out of the magazine 50 when the magazine is in its file block, or when the magazine is being moved to and from the file block.

As shown in FIGURE 1, for example, a stop member 170 is positioned in the station 18 adjacent the leading edge of the side wall 52 of the magazine when the magazine is moved into position in the station 18. The stop member 170 has an extremity 172 which is precisely positioned adjacent the periphery of the drum 10. The extremity 172 defines a feed throat with the drum 10, and it permits one card at a time only to pass from the station onto the periphery of the drum.

The station 18 is illustrated in FIGURE 1 as being in its feeding mode of operation. For that mode of operation, the stack head 22 is withdrawn to a stand-by position, and the feed head 24 is moved to an operative position. A vacuum pressure is established at the face of the feeding head 24, and that face engages the leading card in the station 18. The vacuum pressure exerted at the periphery of the drum 10 also acts on the leading card, but the force exerted on the card by the vacuum pressure in the feed head is greater than the force exerted on the card by the vacuum pressure in the drum so that the feed head 24 holds the card in the station. However, when the vacuum pressure at the face of the feed head 24 is interrupted, the cards pass individually and sequentially through the feed throat formed by the extremity 172 of the stop member 170.

A pair of elongated slide members 174 and 176 are positioned in slots 178 and 180 formed in the inner surfaces of the side walls 52 and 54 respectively. These slide members, as noted above, are fully described and claimed in copending application Serial No. 823,690. The slide members 174 and 176 are spring biased in a manner to be described, so that they normally extend adjacent the mouth of the magazine beyond the ends of the side walls 52 and 54. When the slide members 174 and 176 are in their extended positions, their extremities extend into the plane of the ends of the finger-like elements 78 and 82. The slide members 174 and 176 serve to cage the leading cards in the magazine 50 when the magazine is withdrawn from the station 18. These cards are rigidly retained in the magazine between the bent-over extremities of the finger-like elements and the locked card follower 100. At the same time, lateral movement of the cards is prevented by the slide members 174 and 176 in their extended position.

When the magazine is moved into position in the station 18, a stop member 184, which is mounted in the station 18 adjacent the feed head 24, engages a shoulder on the slide member 176 and forces that slide member to a retracted position back into the slot 180 against the pressure of its biasing spring. This occurs because the slide member is held stationary by the stop member 184 as the magazine is moved forwardly into position in the station. However, when the slide member 176 is in its retracted position, a portion 176a of the slide member extends out from the mouth of the magazine, as shown in FIGURE 1, into a position closely adjacent the feed head 24. This protruding portion 176a of the slide member 176 has an inner surface which is inclined slightly inwardly and which serves to shift the cards in the station laterally to the right into an appropriate feeding position with respect to the feed head 24 after the magazine is in place.

The end of the slide member 174, on the other hand, engages the stop member 170, and the latter slide member is forced entirely back into its slot 178 to a retracted position when the magazine is moved into place. Here, the stop member 170 holds the slide member 174 stationary as the magazine is moved forwardly into position in the station 18.

The station 20 may be identical to the station 18, and a magazine 50a, similar to the magazine 50, may be inserted in the station 20.

The apparatus of FIGURE 1 may be controlled to perform certain sorting or other operations on the cards. In order to perform these operations, the station 18, for example, is first conditioned to a feeding mode and the station 20 is conditioned to a stacking mode. A magazine of cards is then placed in the station 18 and an empty magazine is placed in the station 20. The cards from the magazine in the station 18 are carried by the drum 10 in succession past the transducing means 14 and subsequently deposited into the magazine in the station 20. When the last card leaves the station 18, the operating modes of the two stations may be reversed. Then, the cards in the station 20 may be successively fed to the drum 10 and carried by the drum past the transducer means 16 and deposited in the station 18.

To perform the operations described above, it is necessary that each of the stations 18 and 20 be provided with appropriate electric switching means to indicate when a last card has left either one of the stations, so that the appropriate controls may be initiated to reverse the operating conditions of the stations. In accordance with the present invention, such a control takes the form of a photo-diode and associated relay assembly, or similar photo-electric device, which is mounted on the feed head 24 and which is designated 200 in FIGURE 1, and in the fragmentary view of FIGURE 4. The photo-diode assembly functions in known manner to transform light energy into a corresponding electric signal which closes the associated relay circuit. A light conductor 202 is mounted in a passageway formed in the feed head 24 to extend from the face 24' of the feed head to the active surface of the photo-diode assembly 200. The light conductor 202 may be in the form of a transparent rod having appropriate refracting and reflecting indices so that light incidence on the end of the rod is carried by the rod to its other end. An appropriate material for this purpose is a methyl methacrylate material having the trade name "Lucite."

The face 24' of the feed head 24 is the face at which the vacuum pressure is exerted and which engages the leading card in the magazine 50, as the cards in the magazine are being successively fed to the periphery of the transport drum 10. So long as a card remains in the station, the end of the Lucite rod 202 at the face 24' is covered by that card. However, when the last card has left the station, that end of the rod 202 is exposed, so that any light incident on it is carried to the photo-diode assembly 200 to cause the photo-diode to generate a corresponding electric signal and close its associated relay circuit. The configuration of the light conductor 202, and the manner in which it extends from the face 24' of the feed head 24 to the photo-diode assembly 200, is shown more clearly in the fragmentary perspective view of FIGURE 4.

Figure 4:
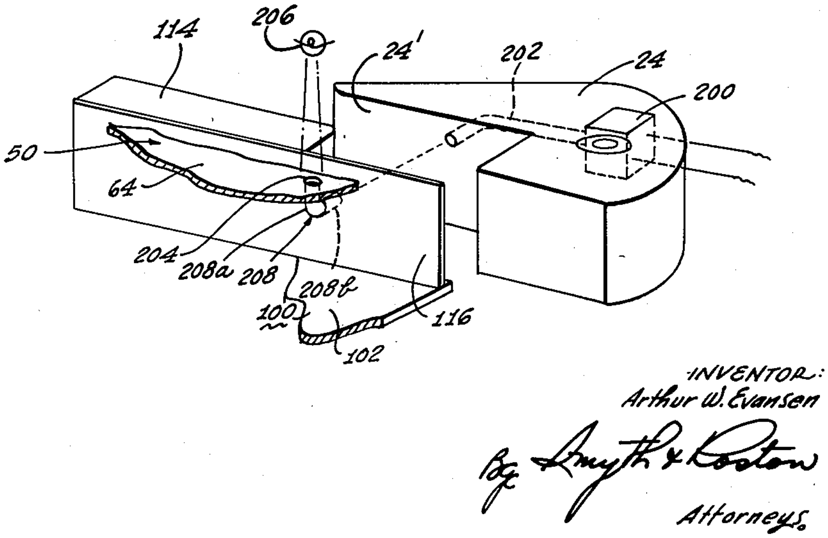
FIGURE 4 is a fragmentary perspective view of various components of the feeding-stacking station shown in FIGURE 1 and particularly illustrates the manner in which the various elements included in the present invention are supported and mounted on the components of the station to accomplish the desired results.

As shown in FIGURES 1 and 4, for example, an aperture 204 is formed in the top 64 of the magazine 50 at a position near the forward edge of the magazine. An appropriate light source, indicated schematically as 206 in FIGURE 4, is mounted directly over the aperture 204 when the magazine 50 is in place in the station 18. The light source 206 is mounted on the table top 12 by any appropriate mounting structure to have a fixed position with respect to the table top. Then, when the magazine 50 is moved into place, the aperture 204 is aligned with the light source, so that the light rays from the source may extend down into the magazine.

The card follower 100 includes a further light conductor 208 which is mounted on the upstanding bracket 116. The light conductor 208 is similar in its construction to the light conductor 202, and it also may be formed of an appropriate light conducting material such as that having the trademark "Lucite." The light conductor 208 moves with the card follower 100 as the latter moves back and forth in the magazine 50. The light conductor 208 has an upwardly extending portion 208a which is moved into alignment with an aperture 204 (FIGURE 4) as the card follower moves forward in the magazine 50 to a position corresponding to its forward limiting position when all the cards have been fed out of the magazine. The light conductor 208 also has a horizontal portion 208b which is aligned with the end of the light conductor 202 (FIGURE 4) at the face 24' of the feed head 24.

Then, when the station 18 is in its feeding mode, so that the feed head 24 is moved to the position shown in FIGURE 1, and as the cards are fed out of the station 18, the card follower 100 gradually brings the light conductor 208 into an aligned position with the aperture 204 and with the end of the light conductor 202. So long as a card remains in the station, however, that card breaks the optical path between the end of the light conductor 208 and the end of the light conductor 202. However, when that card is fed out of the station, the optical path is completed and the light rays from the light source 206 are carried to the photo-diode assembly 200 to cause the assembly to close an electric circuit.

A similar photo-diode and associated relay assembly 200a may be mounted on the feed head 36, and components similar to those described above may be associated with that diode to perform the operating functions described above.

As noted above, the Patent No. 2,969,979 describes in detail a means by which a control system responds to electric signals to change the operating conditions of the stations 18 and 20 between their feeding and stacking modes. Such a system will now be described briefly in conjunction with FIGURES 5 and 6.

As noted above, FIGURE 5 is a view of the under side of the table top 12 in the vicinity of the station 18 to show the mechanical operating controls for the feed head 24 and for the stack head 22. The actuating mechanism for the station 18 includes a cam 214 which is rotatably mounted on a shaft 216 on the under side of the table top 12. A first lever arm 218 is pivotally mounted on a pivot shaft 220, and it carries a cam follower 222 which engages the periphery of the cam 214 when the lever 218 is moved in a counter-clockwise direction about the pivot shaft 220.

A second lever arm 224 is pivotally mounted on a pivot shaft 226 on the opposite side of the cam 214. The lever arm 224 carries a cam follower 228 which engages the periphery of the cam 214 when the lever arm 222 is moved in a clockwise direction about its pivot shaft 226. A coil spring 230 is fastened to the ends of the lever arms 218 and 224, and this spring serves to bias the cam followers 222 and 228 against the periphery of the cam 214.

A pair of switch actuator discs 231 and 232 are mounted on the shaft 216 in coaxial relationship with the cam 214 for angular movement with the cam. A first pair of switches 262, 264 are mounted on the under side of the table top 12 in stacked relationship. These switches each have an actuating arm, and the actuating arms are equipped with respective rollers 274, 276. The roller 274 engages the periphery of the switch actuator disc 231, and the roller 276 engages the periphery of the switch actuator disc 232.

A second switch 280 is mounted on the table top 12 at the opposite side of the switch actuator discs from the switches 262 and 264. The latter switch includes an actuating arm 283 which has a roller 284 mounted at its end. The roller 284 engages the periphery of the switch actuator disc 231. The actuator arms of the switches are suitably biased into engagement with the peripheries of the respective switch actuator discs 231 and 232.

The stack head 22 is supported at the opposite end of the lever arm 224 by means of an upwardly extending pin 236 which extends upwardly through a slot 238 in the table top 12. The feed head 24 is supported at the opposite end of the lever arm 218 by means of a pin 240 which extends upwardly through a slot 242 in the table top 12.

The cam 214 is so shaped that when it is rotated through a first half rotation, the lever arms 218 and 224 are pivoted to move the feed head inwardly to its operative position and the stack head outwardly to its stand-by position. Then, the next half rotation of the cam causes the feed head to move outwardly to its stand-by position and the stack head to move inwardly to its operative position. This action, and the manner in which the cam is driven, are fully described in the Patent No. 2,969,979.

The control system of FIGURE 6 shows schematically the switch actuator discs 231 and 232 which have been previously discussed, and also shows in schematic form the switches 262, 264 and 280 associated with these discs. The actuator disc 232 has a raised portion 232*a* which actuates the roller 274 of the switch 262, and this raised portion also actuates the roller 284 of the switch 280. The switch 262 is actuated and closed when the roller 274 engages the raised portion 232*a* for a particular angular position of the actuator disc 232, and the switch 262 is held closed for an angular increment of the disc 232 of, for example, 40°. The switch 280, on the other hand, is closed when the portion 232*a* is displaced 180° from its position in which the switch 262 is closed. Therefore, for one position of the actuator disc 232, corresponding for example to 0°, the switch 262 is closed. For a second position of the actuator disc 232 corresponding, for example, to 180° the switch 280 is closed.

The actuator disc 231 has two raised portions, namely 231*a* and 231*b* which are separated from each other by an angular distance of, for example, 180°, and which each extend for an angular distance of 60°. These raised portions actuate the roller 272 to close the switch 264 for corresponding portions of the angular travel of the actuator disc 231.

The armature of the switch 262 is connected to one side of the energizing winding of a relay 420. The other side of this relay winding is grounded, and the winding may be shunted by an indicator lamp 422. The relay 420 includes a normally open relay switch 424. The fixed contact of relay switch 424 is connected to one side of the energizing winding of a solenoid 435, the other side of this winding being grounded. This solenoid, as described in the Patent No. 2,969,979, when energized for a brief instant causes the cam 214, and the actuator discs 231 and 232 to be rotated through 180°. The armature of the relay switch 424 is connected to the input terminal 426 of the control system.

The armature of the switch 280 is connected to one side of the energizing winding of a relay 428. The other side of this winding is connected to ground, and the winding is shunted by an indicator lamp 429. The relay 428 includes a normally open relay switch 430. The fixed contact of the switch 430 is connected to the ungrounded side of the energizing windinw of the solenoid 435. The armature of the switch 430 is connected to the input terminal 426.

The fixed contact of the switch 280, together with the fixed contact of the switch 262 and the armature of the switch 264 are connected to the positive terminal of a source of direct voltage 436. The fixed contact of the switch 264 is connected to one side of the energizing winding of a solenoid 431. The other side of this winding is grounded. The solenoid 431 is used to control the vacuum pressure at the surface 24′ of the feed head 24, and the vacuum pressure is removed from that surface when the winding is energized.

A similar control system may be incorporated at the station 20, and a connection may be made to the latter control system over a lead 442. It should be noted that the switch actuator discs 231 and 232 at the station 20 must be displaced 180° with respect to the discs at the station 10. This is in order that the two stations may operate in a complementary manner with one being established in a feeding mode when the other is established in a stacking mode, and vice versa.

The input terminal 426 is connected to the output terminal of an "and" gate 440. "And" gates such as the gate 440 are well known to the electronic computer art. Such networks become enabled only when all of a plurality of input signals applied to respective input terminals of the gate are in their true state. Such networks are shown and described, for example, on page 32 of "Arithmetic Operations in Digital Computers" by R. K. Richards (published by D. Van Nostrand Company, Inc., of Princeton, New Jersey in 1955).

One of the input terminals of the "and" gate 440 is connected to the positive terminal of the saource of direct voltage 436. The other input terminal of the "and" gate 440 is connected to the "true" output terminal of a flip-flop 444. Flip-flops are well known to the electronic digital computer art. Such flip-flops are bi-stable trigger networks and they respond to input signals to assume either a "true" stable condition or a "false" stable condition. The "true" stable condition of the flip-flop 444 is represented by a relatively high voltage on the left output terminal of the flip-flop in FIGURE 6, and the "false" stable condition of the flip-flop 444 is represented by a relatively high voltage on the right output terminal of the flip-flop in FIGURE 6.

The output terminal of an "or" gate 446 is connected to the true input terminal of the flip-flop 444. A delay line 448 of any suitable construction connects the output terminal of the "or" gate 446 to the false input terminal of the flip-flop. "Or" gates are also well known to the electronic art. These gates are also described on page 32 of "Arithmetic Operations in Digital Computers" by R. K. Richards, and they function to translate any one of a plurality of input signals applied to its input terminals, when that input signal is in a true state.

A differentiator 449 has its output terminal connected to one input terminal of the "or" gate 446, and the differentiator has its input terminal connected to one terminal of the capacitor 450. The capacitor 450, in turn, is connected to one terminal of the photo-diode assembly 200 described in conjunction with FIGURES 1 and 4, and which is positioned on the feed head 18 of the station 10. The other terminal of the photo-diode assembly may be connected to the positive terminal of the source of direct voltage 436. When the light rays are incident on the photo-diode 200, under the conditions described above, the photo-diode serves to actuate an associated relay so as to complete a circuit from the positive terminal of the source 436 to the capacitor 450.

A differentiator 452 is connected to a second terminal of the "or" gate 446. A capacitor 454 is connected between the input terminal of the differentiator 452 and one terminal of the photo-diode assembly 200*a* mounted on the feed head 36 at the station 20. The other terminal of the photo-diode assembly 200*a* is connected to the positive terminal of the source of direct voltage 436. The photo-diode assembly 200*a* serves to complete an electric circuit from the positive terminal of the source 436 to the capacitor 454 upon the incidence of light on that photo-diode.

In explaining the operation of the stations 18 and 20, it will be assumed that in the illustrated system of FIGURE 1, the station 18 is in a feeding condition and the station 20 is in a stacking condition. As shown in FIGURE 6, the switch 270 is held closed for this condition and the relay winding 420 and its indicator lamp 422 are energized. This causes the relay switch 424 to be closed so that a circuit from the input terminal 426 to the solenoid winding 436 is prepared. During this operating condition, the photo-diode assembly 200 is de-activated because of the presence of cards in the station, and the photo-diode assembly 200*a* is de-activated because the station 20 is in its stacking mode with the feed head 36 withdrawn to the stand-by position illustrated in FIGURE 1.

However, when the last card leaves the station 18, the photo-diode assembly 200 becomes energized to complete the circuit to the positive terminal of the direct voltage source 436. This causes a surge of current to flow into the capacitor 450 which produces a current pulse. The current pulse is differentiated and sharpened in the differentiator 449 and applied to the left input terminal of the flip-flop 444 through the "or" network 446. It should be appreciated that the capacitor 450 and the differentiator 449 are included only by way of example and that the signals from the photo-diode assembly 200 may be applied directly to the left input terminal of the flip-flop 444 or may be applied through other appropriate circuitry to the left input terminal of the flip-flop.

The flip-flop 444 is triggered by the pulse from the differentiator 449 into its true state. This conditions the "and" gate 440 for translation so that the positive voltage on the positive terminal of the source 436 appears at the output terminal of the "and" gate. This voltage is therefore introduced through the input terminal 426 and the closed relay switch 424 to the solenoid 435. This control is such that the solenoid 435 is energized long enough to cause the cam 214 (FIGURE 5) and the switch actuator discs 231 and 232 to move through 180° in the manner described in the Patent No. 2,969,979.

The cam 214 and the switch actuator discs 231 and 232 are now rotated through 180° in a counter-clockwise direction in FIGURES 5 and 6. As the actuator disc 232 turns, its portion 232*a* moves out of engagement with the roller 274 so that the switch 262 opens. This de-energizes the relay winding 420 and opens the conditioning circuit through the relay switch 424 from the input terminal 426 to the energizing winding of the solenoid 436. After a rotation through a suitable angular distance, such as approximately 30°, the cam 214 begins to bring the stack head 22 of the station 18 into its operating position. After rotation through a suitable angular position, such as approximately 90°, the portion 231*b* of the actuator disc 231 engages the roller 272 to close the switch 264. This causes the vacuum pressure at the surface 24′ of the feed head 24 to be turned off. After rotation through a suitable angular distance, such as approximately 100°, the cam 214 causes the feed head 24 to begin to move back to its stand-by position, and the feed head is moved fully to its stand-by position at 150° rotation of the cam 214.

After a suitable angular rotation, such as approximately 160°, the portion 232*a* of the switch actuator cam 232 engages the roller 284. This causes the switch 280 to close and the relay winding 428 and its indicator lamp 429 to be energized. When the relay winding 428 is energized, the relay switch 430 is closed to prepare a circuit from the input terminal 426 to the energizing winding of the solenoid 436. The system is now stopped until the solenoid 436 is again energized. The station 18 is now controlled to function in its stacking mode.

At the same time that the control described above is taking place in the station 18, the lead 442 causes a similar but displaced control to be taking place at the station 20. That is, the station 20 may be simultaneously controlled and in a similar manner to change from its stacking to its feeding mode, while the station 18 is changing from its feeding to its stacking mode.

Then, as the last card leaves the station 20 at the end of the next operating cycle of the card processing apparatus, the photo-diode assembly 200*a*, in the described manner, completes the circuit from the positive terminal of the source 436 to the capacitor 454. This re-initiates the operations described above and causes the station 20 to return to tis stacking mode of operation and the station 18 to return to its feeding mode.

By means of the control system described above, and under the control of the photo-diode assemblies 200 and 200*a*, the stations 18 and 20 may be automatically operated to cause cards to be fed back and forth between the two stations. The change-over may occur each time that the particular feeding station becomes empty. As noted above, this automatic control of the stations 18 and 20 is desirable for many card handling operations. The particular control of the present invention is most advantageous in that it is not susceptible to wear or mechanical deficiencies. Also, the control system of the present invention has no tendency to develop spurious pulses or to deteriorate in any manner after long periods of use.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In apparatus for processing data on a plurality of information storage elements as represented by signal indications on the elements, the combination of: transport means for the elements, means constructed to hold storage elements in the plurality in stacked relationship and to obtain a controlled transfer of cards between the holding means and the transport means, a light source, light-responsive means, means for establishing an optical path from the light source to the light-responsive means to obtain the production of a signal by the light-responsive means, said last named means including a member movable in the holding means in accordance with the number of elements in the holding means to establish an optical path from the light source to the light-responsive means in the absence from the holding means of storage elements in the plurality, and control means responsive to the signal produced by the light-responsive means upon the establishment of the optical path from the light source to the light-responsive means to control the further transfer of elements between the holding means and the transport means.

2. In apparatus for processing data on a plurality of information storage elements as represented by signal indications on the elements, the combination of: transport means for the elements, means constructed to hold storage elements in the plurality in a stacked relationship, transfer means disposed relative to the holding means and the transport means for obtaining a controlled transfer of storage elements between the transport means and the holding means, light-responsive switching means included in the transfer means, a light source, means responsive to the light from the source for establishing an optical path from the light source to the light-responsive switching means to obtain the production of a signal in the absence of elements in the holding means, said last named means including a light conductor having a variable disposition in the holding means in accordance with the number of elements in the holding means, and control means responsive to the signal produced by the light-responsive switching means upon the establishment of the optical path from the light source to the light-responsive switching means to control the operation of the transfer means in obtaining a transfer of elements between the holding means and the transport means.

3. In apparatus for processing data on a plurality of information storage elements as represented by signal indications on the elements, the combination of: means constructed to hold storage elements in the plurality in a stacked relationship, transport means for the elements, transfer means disposed relative to the transport means and the holding means to obtain a controlled transfer of elements from the holding means to the transport means in a first relationship and to obtain a controlled transfer of elements from the transport means to the holding means in a second relationship, first control means coupled to the transfer means for conditioning the transfer means to the first relationship in a first operating cycle of the control means and for conditioning the transfer means to the second relationship in a second operating cycle of the control means, photo-electric switching means included in the transfer means, a light source disposed in fixed relationship to the holding means, coupling means disposed in the holding means and movable in the holding means in accordance with the number of elements in the holding means for establishing an optical path from the light source through the coupling means to the photo-electric switching means in the absence of elements in the holding means, and electrical control means responsive to the establishment of the optical path to the switching means for converting the first control means from the first operating cycle to the second operating cycle.

4. In apparatus for processing data on a plurality of information storage elements as represented by signal indications on the elements, the combination of: means constructed to hold storage elements in the plurality in a stacked relationship, a feed head actuatable to an operative position to obtain a controlled transfer of storage elements from the holding means and actuatable to a stand-by position, light-responsive switching means mounted on the feed head, a source of light fixedly disposed on the holding means, means included in the holding means and movable in accordance with the number of elements in the holding means for establishing an optical path from the light source through the movable means to the switching means in the operative position of the feed head and in the absence of elements in the holding means, a stack head actuatable to an operative position to obtain a controlled transfer of storage elements into the station and actuatable to a stand-by condition, first control means coupled to the feed head and to the stack head for actuating the feed head to the operative position and the stack head to the stand-by position in a first operating cycle and for actuating the stack head to the operative position and the feed head to the stand-by position in a second operating cycle, and second control means responsive to the establishment of the optical path from the light source to the switching means and coupled to the first control means for obtaining a change in the positions of the feed head and the stack head from the first operating cycle to the second operating cycle.

5. In apparatus for processing data on a plurality of information storage elements as represented by signal indications on the elements, the combination of: means constructed to hold storage elements in the plurality in a stacked relationship, a feed head movable to an operative position to obtain a controlled transfer of elements in the plurality from the holding means and movable to a stand-by position, photo-electric switching means mounted on the feed head, a source of light fixedly disposed on the holding means, light conducting means disposed in the holding means and movable in accordance with the number of elements in the plurality in the holding means for establishing an optical path from the light source through the light conducting means to the photo-electric switching means in the operative position of the feed head and in the absence of storage elements in the plurality in the holding means, a stack head movable to an operative position to obtain a controlled transfer of storage elements into the station and movable to a stand-by position, mechanical control means coupled to the feed head and to the stack head for obtaining a movement of the feed head to the operative position and the stack head to the stand-by position in a first operating cycle and for obtaining a movement of the stack head to the operative position and the feed head to the stand-by position in a second operating cycle, and electrical control means responsive to the establishment of the optical path from the light source to the photo-electric switching means for operating upon the mechanical control means to obtain a change in the operative positions of the feed head and the stack head from the first operating cycle to the second operating cycle.

6. In apparatus for processing data on a plurality of information storage elements as represented by signal indications on the elements wherein the elements are transported by transport means, the combination of: means constructed to hold storage elements in the plurality in a stacked relationship, a feed head movable to an operative position to obtain a controlled transfer of elements from the holding means to the transport means and movable to a stand-by position, photo-electric switching means mounted on said feed head, a first light conductor extending to the photo-electric switching means through the feed head from a surface facing the cards in the holding means, a second light conductor disposed in the holding means and movable in accordance with the number of cards in the holding means and provided with a configuration for establishing an optical path from the light source to the first light conductor in the operative position of the feed head and in the absence of elements in the plurality in the holding means, a stack head movable to an operative position to obtain a controlled transfer of storage elements into the holding means from the transport means and movable to a stand-by position, mechanical control means coupled to the feed head and to the stack head for obtaining a movement of the feed head to the operative position and the stack head to the stand-by position in a first operating cycle and for obtaining a movement of the stack head to the operative position and the feed head to the stand-by position in a second operating cycle, and electrical control means responsive to the establishment of the optical path from the light source to the photo-electric switching means to obtain a change in the positions of the feed head and the stack head from the first operating cycle to the second operating cycle.

7. In apparatus for processing data on a plurality of information storage elements as represented by signal indications on the elements wherein transport means are included in the apparatus for obtaining a movement of the elements, the combination of: means constructed to hold the elements in stacked relationship and disposed in coupled relationship to the transport means, follower means movable in the holding means and disposed relative to the elements in the holding means to maintain the elements in a stacked relationship in the holding means, a feed head movable to an operative position to obtain a controlled transfer of elements from the station and movable to a stand-by positon, the feed head being provided with a particular surface facing the elements in the holding means to obtain a controlled transfer of elements from the holding means, photo-electric switching means mounted on said feed head, first light conductor means extending through the feed head from the particular surface on the feed head to the photo-electric switching means, a source of light supported by the holding means at a position above the holding means, second light conductor means disposed in the holding means and movable in accordance with the number of elements in the holding means and provided with a configuration for establishing an optical path from the light source to the first light conductor means in the operative position of the feed head and in the absence of elements in the holding means, a stack head movable to an operative position to obtain a controlled transfer of elements into the holding means and movable to a stand-by position, mechanical control means coupled to the feed head and to the stack head for obtaining a movement of the feed head to the operative position and the stack head to the stand-by position in a first operating cycle and for obtaining a movement of the stack head to the operative position and the the feed head to the stand-by position in a second operating cycle, and electrical control means responsive to the establishment of the optical path from the light source to the photo-electric switching means for operating upon the mechanical control means to obtain a change of the feed head and the stack head from the first operating cycle to the second operating cycle.

8. The combination set forth in claim 7 in which the holding means includes a magazine removable from disposition in coupled relationship to the transport means.

References Cited in the file of this patent

UNITED STATES PATENTS

| | | |
|---|---|---|
| 1,992,840 | Roesen | Feb. 26, 1935 |
| 2,072,236 | Wormser | Mar. 2, 1937 |
| 2,416,595 | Reynolds | Feb. 25, 1947 |
| 2,572,509 | Novick | Oct. 23, 1951 |
| 2,707,142 | Waite | Apr. 26, 1955 |
| 2,842,362 | Hayes et al. | July 8, 1958 |
| 2,969,979 | Nelson et al. | Jan. 31, 1961 |